United States Patent
Rettig et al.

(10) Patent No.: US 7,075,448 B2
(45) Date of Patent: Jul. 11, 2006

(54) METHOD AND CIRCUIT ARRANGEMENT FOR OFFSET CORRECTION OF A MEASUREMENT BRIDGE

(75) Inventors: Rasmus Rettig, Gerlingen (DE); Emma Axten, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 10/912,677

(22) Filed: Aug. 5, 2004

(65) Prior Publication Data

US 2005/0073325 A1    Apr. 7, 2005

(30) Foreign Application Priority Data

Oct. 1, 2003   (DE)   ................... 103 45 732

(51) Int. Cl.
*B08B 21/00* (2006.01)

(52) U.S. Cl. .............. 340/661; 340/599; 324/610; 324/526; 324/725

(58) Field of Classification Search ........ 340/661, 340/501, 599, 662, 663, 653; 131/138–140; 73/1.01, 1.88, 763; 324/706, 610, 526, 725

See application file for complete search history.

(56) References Cited

U.S. PATENT DOCUMENTS

| | | | | |
|---|---|---|---|---|
| 6,040,779 A | * | 3/2000 | Pfaff et al. | 340/661 |
| 6,118,278 A | * | 9/2000 | Rother | 324/526 |
| 6,329,825 B1 | * | 12/2001 | Tanaka et al. | 324/725 |
| 6,422,088 B1 | * | 7/2002 | Oba et al. | 73/754 |
| 6,433,554 B1 | * | 8/2002 | Kawate et al. | 324/500 |
| 6,534,969 B1 | | 3/2003 | Dietmayer | 324/207.12 |
| 6,608,492 B1 | * | 8/2003 | Entenmann | 324/706 |
| 6,646,446 B1 | * | 11/2003 | Maher et al. | 324/526 |
| 2002/0067255 A1 | | 6/2002 | Tanizawa | 340/514 |

FOREIGN PATENT DOCUMENTS

| | | |
|---|---|---|
| DE | 197 28 381 A1 | 1/1999 |
| EP | 0997701 | 5/2000 |
| EP | 1111344 | 6/2001 |

* cited by examiner

*Primary Examiner*—Toan N. Pham
(74) *Attorney, Agent, or Firm*—Michael J. Striker

(57) ABSTRACT

In the method and circuit arrangement for offset correction of the measurement bridge, the full bridge signal and half bridge signal of the measuring bridge are measured; a self-adjustment of the half bridge signal path to an output signal of the full bridge signal bath is performed to adjust the half bridge signal to the full bridge signal for each measurement cycle between turn on and turn off of the measurement bridge; and an offset value of the half bridge signal path is determined at a time of turning on and the offset value is kept constant during a given measurement cycle.

4 Claims, 3 Drawing Sheets

METHOD AND CIRCUIT ARRANGEMENT FOR OFFSET CORRECTION OF A MEASUREMENT BRIDGE

BACKGROUND OF THE INVENTION

1. Field of the Invention

The present invention relates to a method and circuit arrangement for offset correction of a measurement bridge, especially in connection with a sensor arrangement, in which a measured signal of a full bridge branch and at least one measured signal of at least one half bridge branch are evaluated.

2. Description of the Related Art

A sensor evaluation circuit with a measurement bridge, as is described for example from DE 197 28 381 A1, generally permits a highly precise and reliable measurement of very small signals in the µV. Especially when the measurement bridge is used in safety-critical systems, such as an anti-locking system (ABS) or an electronic stability program in motor vehicles, frequently the same measurement variables and their results from two sensors are compared in a control unit. Alternatively self-monitoring is required in order to be able to reliably detect a faulty sensor and to prevent erroneous operation of the system.

In order to provide a sensor with self-monitoring capability, for example a sensor of the above-described type, in which the measured signal is obtained by analysis of a Wheatstone bridge circuit, besides analysis of the full bridge signal path one of the two half bridge signal paths are also analyzed. This sort of method is used with piezo-resistively operating pressure sensors based on polysilicon.

However the monitoring signal obtained in the above-described manner according to the state of the art disadvantageously has half signal amplitude and a not inherently compensated offset, which exceeds the actual signal amplitude by about an order of magnitude. The results can be a significantly reduced robustness of the monitoring path and thus a significantly increased failure risk for the entire sensor because of the integrated monitoring. The signals from the full bridge and half bridge are specifically corrected in the usual manner in an evaluation circuit and amplified.

In a calibration cycle during manufacturing of the sensor according to the state of the art the installed sensor is adjusted by means of operating parameters and the correction parameters are stored in a non-volatile memory in an analysis circuit. The full bridge and half bridge signals are adjusted according to a correction and an alarm is activated when there is a significant variation. However the conductivity of the sensor is limited by the monitoring path so that frequently sensors, which output the correct useful signal, however signal an error or fault because of a drift in the half bridge path. A clear increase of robustness of the monitoring path should then be achievable.

SUMMARY OF THE INVENTION

It is an object of the present invention to provide a method of the above-described type for offset correction of a measurement bridge, which does not suffer from the above-described disadvantage.

It is another object of the present invention to provide a circuit arrangement for performing this method.

According to the invention a method of the above-described type for offset correction of a measurement bridge, in which a half bridge signal of a half bridge signal path is analyzed as well as the full bridge signal of the full bridge signal path is improved when a self-adjustment of the half bridge signal path to the output signal of the full bridge signal path occurs between the turn on and shut off of the measurement bridge for each measurement cycle. Because of this method the offset value for the respective half bridge signal paths are determined when the circuit arrangement is turned on and kept constant during the measurement cycle.

The method according to the invention thus provides operation of a sensor with a measurement bridge evaluation circuit with a limited self-compensation for the half bridge signal path to the output signal of the full bridge signal path on turning on the sensor. Since for example the pressure at that time on the measuring cell for measuring pressure is not known, the offset value of the half bridge is corrected according to the invention on turn on so that the half bridge signal and the full bridge signal agree with each other.

Additionally in a simple way the permitted correction can be monitored and an error signal produced on shut off. A new offset value is produced for each so-called power-up/power-down measurement cycle, while it is kept constant during the cycle. Optionally it is also possible to store the respectively determined offset correction values of the half bridge path in a non-volatile memory on turn on and thus e.g. to make them available for an error analysis.

A modification of the monitoring path for the offset values of the measurement bridge is at the heart of the invention, whereby especially good long-term stability of the full bridge path is combined with acceptable stability of the half bridge path over a shorter time frame. These benefits are provided without changing the time or frequency behavior of the monitoring in operation.

The circuit arrangement for performing the method according to the invention can comprise e.g. a Wheatstone measurement bridge in the pressure sensor area for sensors with measurement cells made from polysilicon or then metal layers. Means for conducting the half bridge signal and the full bridge signal to the evaluation circuit are provided. The full bridge signal is measured and the respective half bridge signal is monitored for deviations. An offset correction value is determined with an offset correction circuit, which acts on the half bridge signal during measurement of the bridge signals.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
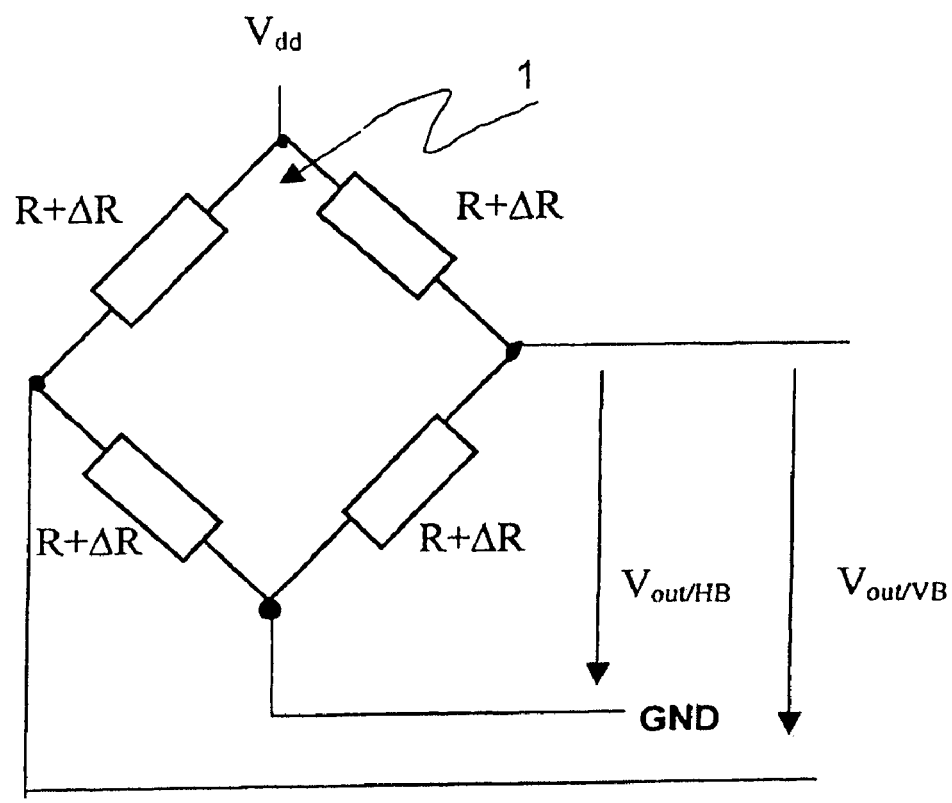
FIG. 1 is a circuit diagram of a measuring bridge.

A circuit diagram of a measuring bridge, for example a Wheatstone bridge circuit, is shown in FIG. 1, as it can be used for a sensor arrangement with a pressure-measuring cell. Respective variable resistors R are arranged in the corresponding bridge branches of the measuring bridge 1, which can each take the value $R+\Delta R$ when acted on with pressure. The measuring bridge 1 is connected on one side to the supply voltage Vdd and on the other side to ground GND. A full bridge signal $V_{out/VB}$ is extracted or picked off at the full bridge signal path and a half bridge signal $V_{out/HB}$ is extracted at the half bridge signal path. These full bridge and half bridge signals are conducted to an input of an evaluation circuit, which is illustrated in FIG. 2.

Figure 2:
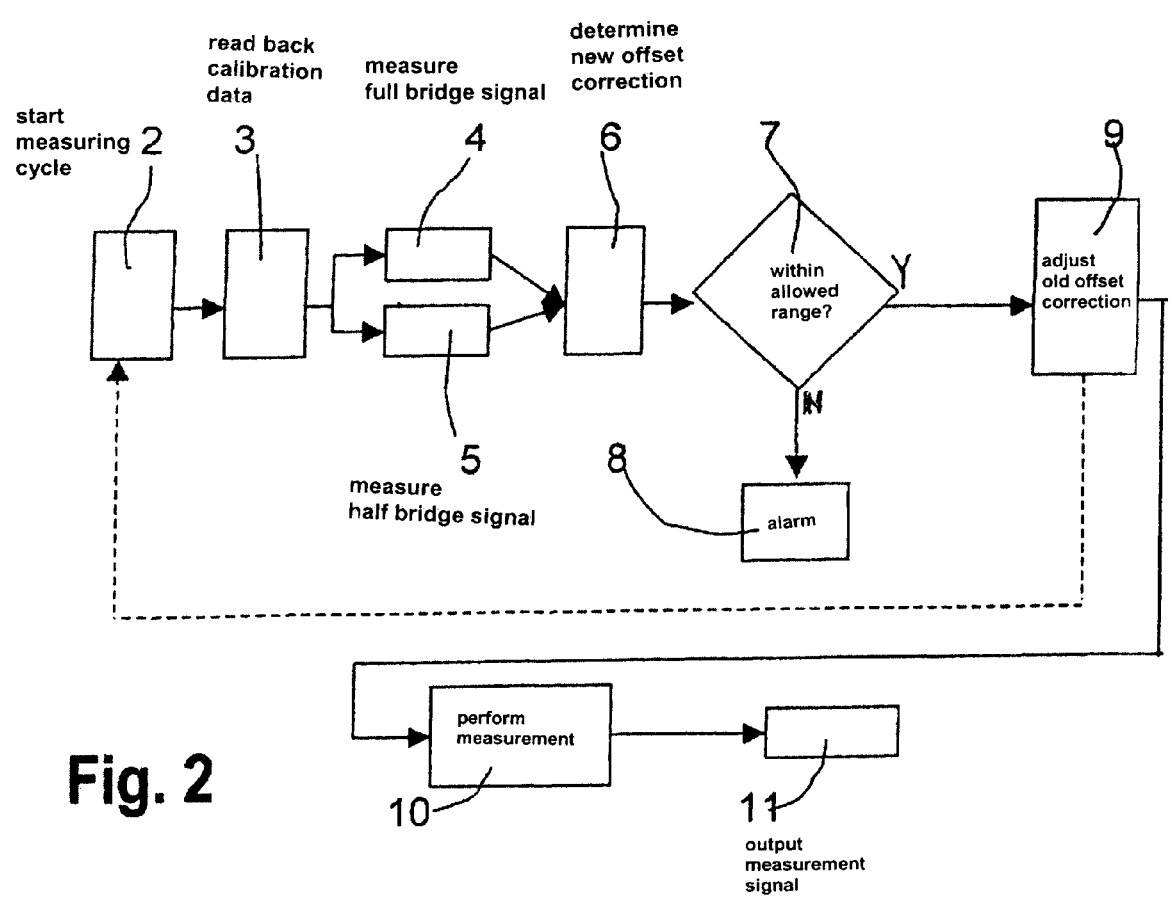
FIG. 2 is a block diagram of an evaluation circuit for a measuring bridge with an adjustment of an offset correction value.

The evaluation circuit, which is not illustrated with a detailed circuit diagram, is described with the aid of the block diagram shown in FIG. 2. A means for turning on the system is symbolized with block 2 and means for reading back calibration data from a non-volatile memory is symbolized with block 3. Means for measuring the full bridge signal of the full bridge signal path VB is symbolized with block 4 and for measuring the half bridge signal of the half bridge signal path HB is symbolized with block 5. The offset correction values for the half bridge signal of the half bridge signal path HB are determined in block 6. Whether this value is within an allowed range or not is determined in block 7.

An alarm signal is issued in block 8 when the allowed range is exceeded. If the value is within the allowed range, the offset correction value is adjusted in the evaluation circuit in block 9. Optionally the newly determined offset correction values can be stored in a memory, which then can be read back again in block 3.

In the latter case a half bridge signal path HB is adapted or corrected to the full bridge signal path by an offset correction each time the sensor is turned on. Accordingly the measurement bridge 1 can perform its sensor function according to FIG. 1 in block 10 and output its measured signal in block 11. After this autocalibration during the starting stage of the sensor the offset value can then be held constant. The time and frequency behavior of the sensor and its monitoring are not impaired, but the robustness of the arrangement is significantly increased.

Figure 3A:
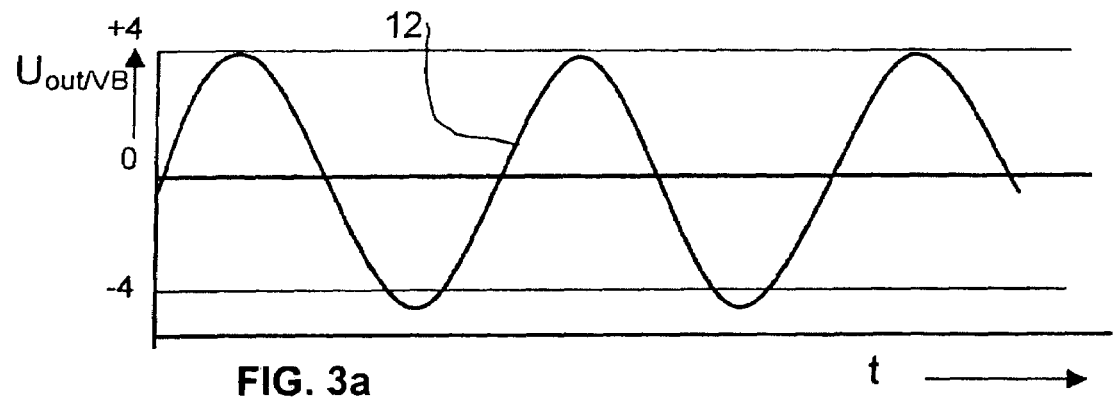
FIGS. 3a and 3b are graphical illustrations of output signals from the measuring bridge.
Figure 3B:
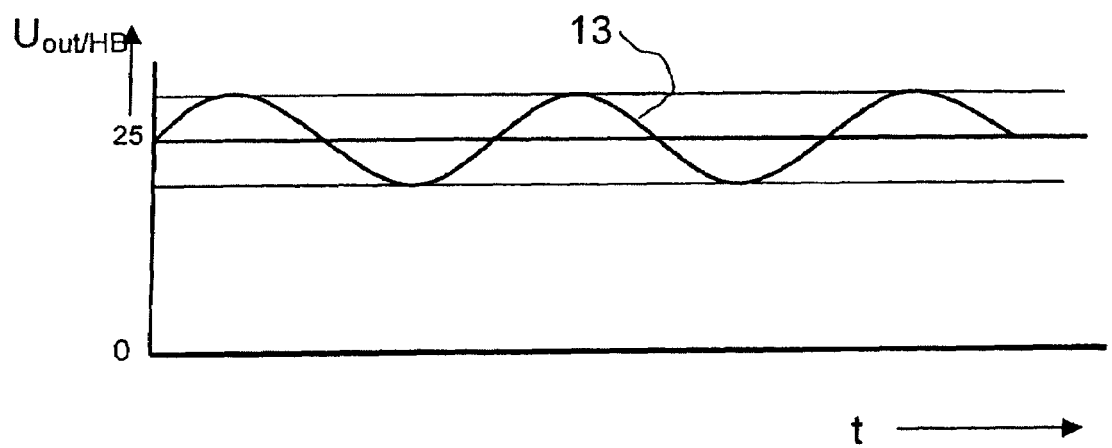

FIGS. 3a and 3b show the behavior of the full bridge signal $V_{out/VB}$ and the half bridge signal $V_{out/HB}$. FIG. 3a shows the time course 12 of the full bridge measured signal $V_{out/VB}$. FIG. 3b shows the time course 13 of the half bridge measured signal $V_{out/HB}$.

The disclosure in German Patent Application 103 45 732.1 of Oct. 1, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and circuit arrangement for offset correction of a measurement bridge, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for offset correction of a measurement bridge, said method comprising the steps of:
   a) measuring full bridge signal of a full bridge signal path of the measuring bridge;
   b) measuring a half bridge signal of a half bridge signal path of the measuring bridge;
   c) performing a self-adjustment of said half bridge signal path to an output signal of said full bridge signal path in order to harmonize said half bridge signal and said full bridge signal for each measurement cycle between turn on and turn off of the measurement bridge; and
   d) determining an offset value of said half bridge signal path at a time of turning on and keeping said offset value constant during a given measurement cycle.

2. The method as defined in claim 1, wherein the offset value is stored in a non-volatile memory during said given measuring cycle and is available for error evaluation during a subsequent measuring cycle.

3. A circuit arrangement for performing a method for offset correction of a measuring bridge, wherein said circuit arrangement comprises
   means for measuring a full bridge signal of a full bridge signal path and a half bridge signal of a half bridge signal path of the measuring bridge;
   means for performing a self-adjustment of said half bridge signal path to an output signal of said full bridge signal path in order to harmonize said half bridge signal and said full bridge signal for each measurement cycle between turn on and turn off of the measurement bridge; and
   means for determining an offset value of said half bridge signal path at a time of turning on and for keeping the offset value constant during a given measurement cycle; and
   means for evaluation of said offset value, said means for evaluation including means for deciding whether or not said offset value is within a predetermined allowable range; means for activating an alarm when said offset value is outside of said allowable range and means for adjusting a previously determined offset value according to said offset value determined at said time of turning on.

4. The circuit arrangement as defined in claim 3, further comprising a non-volatile memory for said offset value.

* * * * *